United States Patent [19]
Balko et al.

[11] Patent Number: 5,965,474
[45] Date of Patent: Oct. 12, 1999

[54] FCC METAL TRAPS BASED ON ULTRA LARGE PORE CRYSTALLINE MATERIAL

[75] Inventors: Jeffrey William Balko, Deptford; Arthur W. Chester, Cherry Hill, both of N.J.; Augusto Rodolfo Quinones, Houston, Tex.

[73] Assignee: Mobil Oil Corporation, Fairfax, Va.

[21] Appl. No.: 08/847,400

[22] Filed: Apr. 29, 1997

[51] Int. Cl.[6] .............................. B01J 29/04; B01J 29/06; B01J 26/08; C01G 11/02
[52] U.S. Cl. ................................ 502/65; 502/60; 502/67; 502/79; 208/113; 208/120; 252/582
[58] Field of Search .................................. 502/60, 67, 65, 502/79; 208/113, 120; 252/582

[56] References Cited

U.S. PATENT DOCUMENTS

| | | | |
|---|---|---|---|
| 3,152,065 | 10/1964 | Sharp et al. | 208/157 |
| 3,261,776 | 7/1966 | Baumann et al. | 208/113 |
| 3,654,140 | 4/1972 | Griffel et al. | 208/113 |
| 3,812,029 | 5/1974 | Snyder et al. | 208/113 |
| 4,093,537 | 6/1978 | Gross et al. | 208/164 |
| 4,118,337 | 10/1978 | Gross et al. | 252/417 |
| 4,118,338 | 10/1978 | Gross et al. | 252/417 |
| 4,218,306 | 8/1980 | Gross et al. | 208/120 |
| 4,444,722 | 4/1984 | Owen | 422/144 |
| 4,459,203 | 7/1984 | Beech et al. | 208/113 |
| 4,639,308 | 1/1987 | Lee | 208/100 |
| 4,675,099 | 6/1987 | Skraba | 208/157 |
| 4,681,743 | 7/1987 | Skraba | 422/140 |
| 4,921,824 | 5/1990 | Chin | 502/65 |
| 5,057,296 | 10/1991 | Beck et al. | 423/277 |
| 5,104,515 | 4/1992 | Chu et al. | 208/46 |
| 5,108,725 | 4/1992 | Beck et al. | 423/263 |
| 5,134,241 | 7/1992 | Le et al. | 585/332 |
| 5,143,707 | 9/1992 | Beck et al. | 423/239 |
| 5,179,054 | 1/1993 | Schipper et al. | 502/67 |
| 5,258,114 | 11/1993 | Aufdembrink et al. | 208/113 |
| 5,264,203 | 11/1993 | Beck et al. | 423/703 |
| 5,300,277 | 4/1994 | Kresge et al. | 423/703 |
| 5,334,368 | 8/1994 | Beck et al. | 423/704 |
| 5,347,060 | 9/1994 | Hellring et al. | 570/235 |
| 5,348,687 | 9/1994 | Beck et al. | 252/582 |

*Primary Examiner*—Gary P. Straub
*Assistant Examiner*—Cam N. Nguyen
*Attorney, Agent, or Firm*—Peter W. Roberts; Malcolm D. Keen

[57] ABSTRACT

A composition for passivating metal contaminants in catalytic cracking of hydrocarbons includes a non-layered, ultra-large pore crystalline material with at least one peak at a position greater than about 18 Angstrom Units d-spacing with a relative intensity of 100, and a benzene adsorption capacity of greater than about 15 grams benzene per 100 grams anhydrous crystal at 50 torr and 25° C., and a metal passivator incorporated within the crystalline material. A method for passivating contaminating metals uses the composition during catalytic cracking as an additive or as a component of the catalyst.

13 Claims, No Drawings

FCC METAL TRAPS BASED ON ULTRA LARGE PORE CRYSTALLINE MATERIAL

BACKGROUND OF THE INVENTION

1. Field of the Invention

This invention relates to deactivation of metal contaminants in catalytic cracking of hydrocarbons using an ultra large pore crystalline material and a metal passivator incorporated in the material.

2. Description of the Prior Art

Conversion of heavy petroleum fractions to lighter products by catalytic cracking is well known in the refining industry. Fluidized Catalytic Cracking (FCC) is particularly advantageous for that purpose. The heavy feed contacts hot regenerated catalyst and is cracked to lighter products. Carbonaceous deposits form on the catalyst, thereby deactivating it. The deactivated (spent) catalyst is separated from cracked products, stripped of strippable hydrocarbons and charged to a regenerator, where coke is burned off the catalyst with air, thereby regenerating the catalyst. The regenerated catalyst is then recycled to the reactor. The reactor-regenerator assembly are usually maintained in heat balance. Heat generated by burning the coke in the regenerator provides sufficient thermal energy for catalytic cracking in the reactor. Control of reactor conversion is usually achieved by controlling the flow of hot regenerated catalyst to the reactor to maintain the desired reactor temperature.

In most modern FCC units, hot regenerated catalyst is added to the feed at the base of a rise reactor. The fluidization of the solid catalyst particles may be promoted with a lift gas. Mixing and atomization of the feedstock may be promoted with steam, equal to 1–5 wt % of the hydrocarbon feed. Hot catalyst (above 650° C.) from the regenerator is mixed with preheated (150°–375° C.) charge stock. The catalyst vaporizes and superheats the feed to the desired cracking temperature usually 450°–600° C. During the upward passage of the catalyst and feed, the feed is cracked, and coke deposits on the catalyst. The coked catalyst and the cracked products exit the riser and enter a solid-gas separation system, e.g., a series of cyclones, at the top of the reactor vessel. The cracked products are fractionated into a series of products, including gas, gasoline, light gas oil, and heavy cycle gas oil. Some heavy cycle gas oil may be recycled to the reactor. The bottoms product, a "slurry oil", is conventionally allowed to settle. The catalyst-rich solids portion of the settled product may be recycled to the reactor. The clarified slurry oil is a heavy product.

The "reactor vessel" into which the riser discharges primarily separates catalyst from cracked products and unreacted hydrocarbons and permits catalyst stripping.

Older FCC units use some or all dense bed cracking. Down flow operation is also possible, in which case catalyst and oil are added to the top of a vertical tube, or "downer", with cracked products removed from the bottom of the downer. Moving bed analogs of the FCC process, such as Thermofor Catalytic Cracking (TCC) are also known.

Further details on FCC can be found in U.S. Pat. No. 3,152,065 (Sharp et al); U.S. Pat. No. 3,261,776 (Banman et al); U.S. Pat. No. 3,654,140 (Griffel et al.); U.S. Pat. No. 3,812,029 (Snyder); U.S. Pat. Nos. 4,093,537, 4,118,337, 4,118,338, 4,218,306 (Gross et al); U.S. Pat. No. 4,444,722 (Owen); U.S. Pat. No. 4,459,203 (Beech et al.); U.S. Pat. No. 4,639,308 (Lee); U.S. Pat Nos. 4,675,099, 4,681,743 (Skraba) as well as in Venuto et al, Fluid Catalytic Cracking With Zeolite Catalysts, Marcel Dekker, Inc. (1979). These patents and publication are incorporated herein by reference.

Conventional FCC catalysts usually contain finely divided acidic zeolites comprising e.g., faujasites, such as Rare Earth Y (REY), Dealuminized Y (DAY), Ultrastable Y (USY), Rare Earth Ultrastable Y (RE-USY), silicon enriched dealuminized Y and Ultrahydrophobic Y (UBP-Y).

Typically, FCC catalysts are fine particles having particle diameters ranging from about 20 to 150 microns and an average diameter around 60–80 microns.

Catalyst for use in moving bed catalytic cracking units (e.g., TCC units) can be in the form of spheres, pills, beads, or extrudates, and can have a diameter ranging from 1 to 6 mm.

A process for catalytic cracking over an ultra large pore crystalline material catalyst has been described in U.S. Pat. No. 5,258,114. U.S. Pat. No. 5,258,114 describes a process particularly suited to converting "bottom of the barrel" or resid fractions into lighter components via catalytic cracking.

Although many advances have been made in catalytic cracking, and in cracking catalysts, some problem areas remain.

Heavy feeds available for processing, such as vacuum residua, contain contaminating metals which can include nickel, vanadium, iron, copper and molybdenum. These metals may be present in the hydrocarbon feed as free metals or as components of inorganic and organic compounds such as porphyrins and asphaltenes. Deposition of contaminating metals on cracking catalysts causes a gradual deterioration of the catalyst and unwanted side reactions, for example, producing hydrogen, light gases such as methane and ethane, and coke, at the expense of more valuable products.

Various methods have been described for trapping or passivating contaminating metals. In U.S. Pat. No. 5,258,114, metal getters or sinks such as alkaline and/or rare earth compounds may be present as part of the matrix or as separate additives of the metal getter alone.

In U.S. Pat. No. 4,921,824, discrete particles of lanthanum oxide or other rare earth oxides are added to the catalyst and hydrocarbon to passivate metal contaminants during catalytic cracking.

Problems caused by metal contaminants still remain.

SUMMARY OF THE INVENTION

Passivation of metal contaminants during catalytic cracking is accomplished using a composition which comprises a combination of a metal passivator and an ultra large pore crystalline material exhibiting, after calcination, an X-ray diffraction pattern with at least one peak at a position greater than about 18 Angstrom Units d-spacing with a relative intensity of 100, and a benzene adsorption capacity of greater than about 15 grams benzene per 100 grams anhydrous crystal at 50 torr and 25° C. This ultra large pore crystalline material has been termed M41S. The metal passivator is incorporated within the pores of the large pore crystalline material. In a preferred embodiment, the metal passivator is a rare earth metal compound or an alkaline earth metal compound.

The composition can be used as an additive, i.e., a separate particle, or as a component of a cracking catalyst, i.e., included with the active cracking particle.

Advantageously, the high pore volume, high surface area and uniform pores of the ultra larger pore crystalline material provide better support for metals passivating compounds than the amorphous matrix materials which were used in the past.

DETAILED DESCRIPTION OF THE INVENTION

The metal passivators preferably include rare earth compounds and alkaline earth metal compounds or mixtures thereof. The metal passivators more preferably include rare earth oxides ($RE_2O_3$) and alkaline earth metal oxides.

The rare earth metals include a group of elements in group III of the periodic table and have similar properties in aqueous solutions. The rare earth metal consists of scandium ($^{21}Sc$), yttrium ($^{39}Y$), and the lanthanide series including lanthanum ($^{57}La$), cerium ($^{58}Ce$), praesodynium ($^{59}Pr$), neodynium ($^{60}Nd$), promethium ($^{61}Pm$), samarium ($^{62}Sm$), europium ($^{63}Eu$), gadolinium ($^{64}Gd$), terbium ($^{65}Tb$), dysprosium ($^{66}Dy$), holmium ($^{67}Ho$), erbium ($^{68}Er$), thulium ($^{69}Tm$), ytterbium ($^{70}Yb$) and lutitium (71Lu).

Rare earth oxides may be obtained from a commercial source or from one or more minerals such as monazite, bastnasite, cerite, loparite, orthite, gadolinite, xenotime, and euxenite. These minerals are widely found in nature and are not "rare". Monazite and bastnasite are the preferred sources since they contain 50–80% rare earths, of which 90% consists of the lighter lanthanide. Xenotime is a source of yttrium and the heavy rare earths. Through normal mining techniques, the ores can be concentrated to give more than 85% rare earth oxides. Purification to 100% rare earth oxides can be achieved by acid leaching and calcination. The rare earth compounds also include water-soluble salts such as chlorides, bromides, nitrates, bromates and perchlorate salts.

The alkaline earth metals will be considered to include divalent metals in the second group of the periodic system. Members include beryllium, magnesium, calcium, strontium, barium and radium. The elements form stable oxides and carbonates. Preferred alkaline earth compounds for use as metal passivators include, for example, barium oxides, magnesium oxides and calcium oxides.

The metal passivator is introduced into the ultra large pore crystalline material by any suitable method. Methods for introducing metal compounds into crystalline material are known in the art and include, for example, impregnation and exchange. The metal passivator is present in the ultra large pore crystalline material preferably in an amount of from about 0.1 to about 25 weight percent of the composition, more preferably from about one to about 10 weight percent.

When the composition is used as a separate particle additive for an FCC catalyst, it may be added preferably in an amount of up to about 50 weight percent, more preferably from about 5 to 30 weight percent of the catalyst. Average particle size is preferably in the range of 60–125 $\mu$m, more preferably 70–105 $\mu$m. It may be desirable for the average particle size to be larger than the equilibrium catalyst to which it is added so that it is retained more efficiently.

When the composition is used as a component of an FCC catalyst, it may be added to a matrixed FCC catalyst preferably from about 5 to about 30 weight percent, more preferably from about 10 to about 25 weight percent of the catalyst.

The ultra large pore crystalline material M41S is described in U.S. Pat. No. 5,102,643 and the synthesis of the material is described in U.S. Pat. Nos. 5,108,725 and 5,057,296. The material is discussed in detail below.

The compositions of the invention deactivate metal contaminants during catalytic cracking.

CATALYTIC CRACKING CONDITIONS

Conventional catalytic cracking conditions may be used. More details may be taken from the patents which have been incorporated by reference.

FEEDS

Conventional feeds may be used. Most FCC and TCC units crack gas oil or vacuum gas oil feeds, i.e., those having an initial boiling point above 4000°–500° F., and an end boiling point above 750°–850° F. The process tolerates feed including wholly or partly non-distillable fraction, e.g., boiling above 1000° F., boiling range material. Resids, deasphalted resids, tar sands, shale oils, coal liquids and similar heavy material, may be used as part or all of the feed.

CRACKING CATALYSTS

The preferred cracking catalysts for use herein include rare earth exchanged and/or ultrastable faujasites.

In addition to ultra large pore material incorporated with metal passivator for passivation of metal contaminants, the cracking catalyst can contain effective amounts of an ultralarge pore material such as M41 S as described in U.S. Pat. No. 5,102,643 as a cracking catalyst. When ultra-large pore material is used as the cracking catalyst, it is combined with a matrix and is also preferably combined with additional convention large pore molecular sieves such as X or Y, and shape selective zeolites such as ZSM-5.

The cracking catalyst can be a conventional large pore zeolite. Some of these, and patents describing their preparation are discussed hereinafter. Zeolite L, faujasites such as zeolite X, zeolite Y, rare earth exchanged faujasites such as REX and REY, and preferably higher silica forms of Y such as Dealuminized Y (AY Y: U.S. Pat. No. 3,442,795); Ultrastable Y (USY: U.S. Pat. No. 3,449,070); Ultrahydrophobic Y (UHP-Y: U.S. Pat. No. 4,331,694; U.S. Pat. No. 4,401,556), and similar materials are preferred for use herein. Zeolite Beta (B, U.S. Pat. No. 3,308,069) or Zeolite L (U.S. Pat. No. 3,216,789; U.S. Pat. No. 4,544,539; U.S. Pat. No. 4,554,146 and U.S. Pat. No. 4,701,315) may also be used. These materials may be subjected to conventional treatments, such as impregnation or ion exchange with rare earths to increase stability. These patents are incorporated herein by reference.

These large-pore molecular sieves have a geometric pore opening of about 7 angstroms in diameter. In current commercial practice, most of the cracking of large molecules in the feed is done using these large pore molecular sieves, while cracking of extremely large molecules is usually left to the amorphous matrix. In contrast, in the process of the present invention, when ultra large pore material is used as the cracking catalyst, it cracks the extremely large molecules (more efficiently than the amorphous matrix) and leaves cracking of the remainder to the large-pore molecular sieve.

Very Large Pore Cracking Component

In addition to the ultra-large and large-pore cracking components described, several recently developed very large-pore cracking components may also be used. All of these materials have a geometric pore opening or portal greater than about 7 Angstroms in diameter.

VPI-5 is a molecular sieve with pore openings or portals larger than about 10 Angstrom units in diameter. They are aluminophosphate based sieves with 18-member rings of tetrahedrally-coordinated or T-atoms. They resemble the better known $AlPO_4$-5 materials. Such molecular sieves have very large pore volumes, and extremely large pore openings. Such large pore sieves would be very useful for cracking the very large molecules associated with high boiling or residual fractions. By contrast faujasites have portals containing 12 member rings. VPI-5 was described by M. Davis, C. Saldarriaga, C. Montes, and J. Garces in a paper presented at "Innovations in Zeolite Materials Science" Meeting in Nieuwpoort, Belgium. Sep. 13–17, 1987. M. E. Davis, C. Saldarriaga, C. Montes, J. Garces and C. Crowder, Nature 331, 698 (1988).

Pillared, interlayered clays may also be used as a large pore cracking components. U.S. Pat. No. 4,742,033 discloses a pillared interlayered clay. This patent is incorporated by reference.

U.S. Pat. No. 4,515,901 discloses forming an interlayered pillared clay by mixing a clay with a polar solvent, a soluble carbohydrate, and a soluble pillaring agent. The mixture is then heated to form the interlayered pillared clay. Useful clays are smectites such as montmorillonite.

In U.S. Pat. No. 4,367,163, pillars of silica added to smectites increase the interplatelet distances. U.S. Pat. Nos. 4,515,901, and 4,367,163 are incorporated herein by reference.

U.S. Pat. No. 4,757,041, which is incorporated herein by reference, discloses a class of pillared interlayered clay molecular sieves products with regularly interstratified mineral structure. These materials are prepared by cross-linking interstratified mineral clay, and are reported to possess extraordinary thermal and hydrothermal stabilities.

U.S. Pat. No. 4,600,503 (Angevine et al), which is incorporated herein by reference, discloses thermally stable layered metal oxides containing interspathic polymeric oxides employed in hydrotreating catalyst used to upgrade residual oils. The layered materials disclosed in that patent may be used as all of part of a large pore cracking catalyst as described in U.S. Pat. No. 5,258,114.

Published European patent application EP 0 285 278 A2 (Kirker et al), which is incorporated herein by reference, discloses hydrocracking a heavy feed containing polycyclic aromatics to form a lube based stock. The hydrocracking catalyst is a layered silicate such as magadiite which contains interspathic polymeric silica and interspathic polymeric oxides of one or more of Al, B, Cr, Ga, In, Mo, Nb, Ni, Ti, Tl, W and Zr. Such layered silicates may be used as all or part of the large pore cracking component of the present invention.

Published European Application EP 0 205 711 A2 (Chu et al), which is incorporated herein by reference, discloses layered oxides containing interlayer polymeric oxides and their synthesis. Layered oxides of high thermal stability and surface area which contain interlayer polymeric oxides such as polymeric silica are prepared by ion exchanging a layered metal oxide, such as layered titanium oxide, with organic cation to spread the layers apart. A compound, such as tetraethylorthosilicate, capable of forming a polymeric oxide, is thereafter introduced between the layers. The resulting product is treated to form polymeric oxide, e.g., by hydrolysis to produce the layered oxide product. Such layered materials may be as used all or part of the large pore cracking component of the present invention.

U.S. Pat. No. 4,238,364 discloses the preparation of stabilized pillared, interlayered clays. U.S. Pat. No. 4,665,220 discloses use of these clays as catalysts in reactions capable of catalysis by protons. The contents of both of these patents are incorporated herein by reference.

SAPO's, or silicon-substituted aluminophosphates, such as SAPO-37, which have a three dimensional crystal framework of suitable size may also be used as the large pore cracking component. U.S. Pat. Nos. 4,440,871, 4,741,892 and 4,689,138, which are incorporated herein by reference, disclose silicoaluminophosphate molecular sieves.

The large pore component may comprise mixtures of one or more of suitable materials, e.g., an equal mix of catalytically active forms of RE-USY, VPI-5 and a pillared clay.

Expressed as Constraint Index, CI, the large pore cracking component should have a CI of less than 1 and preferably less than 0.8. Details of the Constraint Index test procedures are provided in J. Catalysis 67, 218–222 (1981) and in U.S. Pat. No. 4,711,710 (Chen et al.), which are incorporated herein by reference.

Shape Selective Zeolites

Shape selective zeolites are highly beneficial additives to or part of the ultra large pore or large pore cracking catalyst. Any zeolite having a constraint index of 1–12 can be used herein but ZSM-5 is especially preferred. Details of the Constraint Index test procedures are provided in the references cited above.

Preferred shape selective zeolites are exemplified by ZSM-5, ZSM-1 1, ZSM-12, ZSM-23, ZSM-35, ZSM-48, ZSM-57 and similar materials.

ZSM-5 is described in U.S. Pat. No. 3,702,886, U.S. Pat. No. Re. 29,948 and in U.S. Pat. No. 4,061,724 (describing a high silica ZSM-5 as "silicalite").

ZSM-1 1 is described in U.S. Pat. No. 3,709,979.

ZSM-12 is described in U.S. Pat. No. 3,832,449.

ZSM-23 is described in U.S. Pat. No. 4,076,842.

ZSM-35 is described in U.S. Pat. No. 4,016,245.

ZSM-57 is described in U.S. Pat. No. 4,046,859.

MCM-22 is described in U.S. Pat. No. 4,954,325.

These patents are incorporated herein by reference.

Zeolites in which some other framework element is present in partial or total substitution of aluminum can be advantageous. Elements which can be substituted for part of all of the framework aluminum are boron, gallium, zirconium, titanium and trivalent metals which are heavier than aluminum. Specific examples of such catalysts include ZSM-5 and zeolite Beta containing boron, gallium, zirconium and/or titanium. In lieu, of, or in addition to, being incorporated into the zeolite framework, these and other catalytically active elements can also be deposited upon the zeolite by any suitable procedure, e.g., impregnation.

Preferably, relatively high silica shape selective zeolites are used, i.e., with a silica/alumina ratio above 20/1, and more preferably with a ration of 70/1, 100/1, 500/1 or even higher.

Preferably the shape selective zeolite is placed in the hydrogen form by conventional means, such as exchange with ammonia and subsequent calcination. The hydrogen form of ZSM-5 is believed to be optimum for paraffin cracking. The zeolite may be used in any form, however which is useful in the cracking process. It will frequently be beneficial to use a shape selective zeolite component which promotes paraffin aromatization at catalytic cracking conditions.

Gallium ZSM-5 is especially preferred for use herein because of its ability to convert light paraffins such as propanes and butanes into aromatic hydrocarbons which are valuable as petrochemicals or as high octane gasoline blending components. Gallium may be incorporated into the zeolite framework during synthesis or it may be exchanged or impregnated or otherwise incorporated into the ZSM-5 after synthesis. Preferably 0.05 to 10 and most preferably 0.1 to 2.0 wt % gallium is associated with the aromatization zeolite.

More details on paraffin aromatization zeolites, and their use in catalytic cracking, may be taken from U.S. Pat. Nos. 4,988,653; 4,929,339 and 5,006,497, which are incorporated herein by reference.

MATRIX

The matrix can be conventional. The function of the matrix in catalytic cracking catalyst is well known. Briefly stated, it holds the sieve in a suitably strong particle so that feed may contact it without physical loss of the catalyst by entrainment or attrition. The matrix acts to some extent as a sodium and metals sink, and minimizes localized high temperatures when burning coke from the molecular sieve and may have other functions.

Catalyst Manufacture

The cracking catalyst can be made using conventional techniques for mixing molecular sieves and matrix materials.

The different zeolite or molecular sieve components can be dry blended or wet ball milled together, and then added to a suitable matrix, e.g., a silica-alumina gel, clay composite or an alumina-clay composite and further mixed. The matrix and zeolite mixture can be extruded, pilled, marumerized, dropped in an oil bath, etc. to form relatively large particles. For use in fluidized bed catalytic cracking units the matrix-zeolite mixture is preferably spray dryed, but any other means can be used to make fluidizable catalyst particles, such as crushing or grinding larger size extrudates or pills.

It is preferred to have the crystalline zeolite or molecular sieve component in a suitable matrix, since this catalyst form is generally characterized by a high resistance to attrition, high activity and exceptional shear stability. Such catalysts are readily prepared by dispersing the crystalline zeolite in a suitable silica or alumina sol (e.g., colloidal silicas such as Ludox or Nalcoag brand colloidal silicas, or as prepared by rapid neutralization, alumina chlorhydrol or similar materials or peptized aluminas). Catalysts may also be prepared by forming a siliceous sol and gelling the sol by various means. The inorganic oxide which serves as the matrix in which the above crystalline zeolite is distributed includes silica gel or a cogel of silica and a suitable metal oxide. Representative cogels include silica-alumina, silica-magnesia, silica-zirconia, silica-thoria, silica-beryllia, silica-titania, as well as ternary combinations such as silica-alumina-magnesia, silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 weight percent, preferably 60 to 95 weight percent and the other metal oxide or oxides content will generally be within the range of 0 to 45 weight percent and preferably 5 to 50 weight percent. In addition to the above, the matrix may also comprise natural or synthetic clays, such as kaolin type clays, montmorillonite, bentonite or halloysite. These clays may be used alone or in combination with silica or any of the above specified cogels in matrix formulation.

The conventional, large pore cracking component, if included, may be present in catalytically effective amounts, preferably 10 to 50 wt % of the finished catalyst, or catalyst inventory if blends of different materials are used. When an ultra large pore cracking component is used, usually it will be preferred to use relatively large amounts of the ultra large pore cracking component, because such materials have only moderate cracking activity. Thus, catalyst containing 20 wt. % RE-USY zeolite, and 20 to 40 wt % MCM-41 will give very good results. Expressed as weight percent of total catalyst, the ultra large pore cracking catalyst would have the following composition when the ultra large pore cracking catalyst contains 50 wt. % total zeolite:

Matrix—50 wt. % or 25 to 95 wt.%

Large pore molecular sieve—20 wt. % or 5–50 wt. %, preferably 10–45 wt %.

Ultra large pore molecular sieve—30 wt. % or 10–80 wt. %, preferably 10–50 wt %.

Shape Selective Zeolite–0.1–20 wt. %, preferably 0.5–5 wt %.

If conventional large pore cracking component is used without ultra large pore cracking component, the large pore cracking component in a matrix is preferably 10 to 90 wt. of the catalyst, more preferably 20 to 60 wt. % and a Shape Selective Zeolite is preferably 0.1 to 50 wt. %, more preferably 1 to 40 wt. % and the catalyst composition includes 10 to 90 wt. % matrix material, preferably 40 to 80 wt. %.

ULTRA LARGE PORE COMPONENT

To provide passivation of metal contaminants, a support material for metal passivator is ultra large pore crystalline material, preferably M41 S. The preparation and characterizations of this material are disclosed in U.S. Pat. Nos. 5,102,643 and 5,057,296. See also, J. S. Beck et al., *J. Am. Chem. Soc.* 114, 10834–10843 (1992). Certain forms of M41S are described in U.S. Pat. Nos. 5,098,684 and 5,198,203. These patents are incorporated herein by reference. The ultra large pores are up to 100 Angstroms, preferably 30–80 Angstroms. Details on preparation and characterization of these materials is reported below.

The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence of absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to describe these materials is "X-ray indifferent". The microstructure of the silicas consists of 100–250 Angstrom particles of dense amorphous silica (*Kirk-Othmer Encyclopedia of Chemical Technology*, 3rd Edition, Vol. 20, John Wiley & Sons, New York, p. 766–781, 1982), with the porosity resulting from voids between the particles. Since there is no long range order in these materials, the pores tend to be distributed over a rather large range. This lack of order also manifests itself in the X-ray diffraction pattern, which is usually featureless.

Paracrystalline materials such as the transitional aluminas also have a wide distribution of pore sizes, but better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum", Technical Paper No.19 Revised. Alcoa Research Laboratories, p. 54–59, 1987). Since, in the case of either material, there is no long range order controlling the sizes of pores in the material, the variability in pore size is typically quite high. The sizes of pores in these materials fall into a regime called the mesoporous range, which, for the purposes of this application, is from about 13 to 200 Angstroms.

In sharp contrast to these structurally ill-defined solids are materials whose pore size distribution is very narrow because it is controlled by the precisely repeating crystalline nature of the materials' microstructure. These materials are called "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolite material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g., $AlO_4$ in which the tetrahedra are cross-linked by the sharing of oxygen atoms whereby the ratio of the total Group IIIB element, e.g., aluminum, and Group IVB element, e.g., silicon, atoms to oxygen atoms is 1:2. The electrovalence of the tetrahedra containing the Group IIIB element, e.g., aluminum, is balanced by the inclusion in the crystal of a cation, for example, an alkali metal or an alkaline earth metal cation. This can be expressed wherein the ratio of the Group IIIB element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

The $SiO_2/Al_2O_3$ of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (U.S. Pat. No. Re. 29,948) discloses a porous crystalline silicate made from a reaction mixture containing no deliberately added alumina in the recipe and exhibiting the X-ray diffraction patter characteristic of ZSM-5. U.S. Pat. Nos. 4,061,724; 4,073,865 and 4,104,294 describe crystalline silicate of varying alumina and metal content.

Aluminum phosphates are taught in U.S. Pat. Nos. 4,310,440 and 4,385,994, for example. These aluminum phosphate materials have essentially electroneutral latices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "$H_1$" phase or hydrate of aluminum phosphate of F. d'Yvoire, Memoir Presented to the Chemical Society, No. 392. "Study of Aluminum Phosphate and Trivalent Iron", Jul. 6, 1961 (received), pp. 1762–1776. This material, when crystalline, is identified by the JCPDS International Center for Diffraction Data card number 15–274. Once heated to 110° C. the d'Yvoire material becomes amorphous or transforms to the aluminophosphate form of tridymite.

Compositions comprising crystals having a framework topology after heating at 100° C. or higher giving an X-ray diffraction pattern consistent with a material having pore windows formed by 18 tetrahedral members of about 12–13 Angstroms in diameter are taught in U.S. Pat. No. 4,880,611.

A naturally occurring, highly hydrated basic ferric oxyphosphate mineral, cacoxenite, is reported by Moore and Shen, Nature, Vol. 306, No. 5941, pp. 356–358 (1983) to have a framework structure containing very large channels with a calculated free pore diameter of 14.2 Angstroms. R. Szostak et al., Zeolites: Facts, Figure, Future, Elsevier Science Publishers B. V., 1989, present work showing cacoxenite as being very hydrophilic, i.e., absorbing nonpolar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e., silicoaluminophosphates of particular structures are taught in U.S. Pat. No. 3,355,246 (i.e. ZK-21) and U.S. Pat. No. 3,791,964 (i.e. ZK-22). Other teachings of silicoaluminophosphates and their synthesis include U.S. Pat. No. 4,673,559 (two-phase synthesis method); U.S. Pat. No. 4,623,527 MCM-10); U.S. Pat. No. 4,639,358 (MCM-1); U.S. Pat. No. 4,647,442 (MCM-2); U.S. Pat. No. 4,664,897 (MCM-4); U.S. Pat. No. 4,638,357 (MCM-5); and U.S. Pat. No. 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphate-substituted zeolites of Canadian Patents 911,416; 911,417; and 911,418 are referred to as "aluminosilicophosphate" zeolites. Some of the phosphorous therein appears to be occluded, not structural.

U.S. Pat. No. 4,363,748 describes a combination of silica and aluminum-calcium-cerium phosphate as a low acid activity catalyst for oxidative dehydrogenation. UK 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Angstroms, with the largest reported being about 12 Angstroms.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared materials is narrower than those in amorphous and paracrystalline materials but broader than that in crystalline framework materials.

As demonstrated hereinafter, the inorganic, non-layered mesoporous (ultra large pore) crystalline material, M41 S, described in U.S. Pat. No. 5,102,643 and 5,057,296, used in this invention has the following composition:

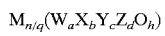

wherein W is a divalent element, such as a divalent first row transition metal, e.g., manganese, cobalt and iron, and/or magnesium, X is a trivalent element, such as aluminum, boron, iron and/or gallium, preferably aluminum; Y is a tetravalent element such as silicon and/or germanium, preferably silicon: Z is a pentavalent element, such as phosphorous: M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d)=1.

A preferred embodiment of the above crystalline material is when (a+b+c) is greater than d, and h=2. A further embodiment is when a and d=0, and h=2.

In the as-synthesized form, the M41S material has a composition, on an anhydrous basis, express empirically as follows:

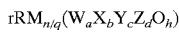

wherein R is the total organic material not included in M as an ion, and r is the coefficient for R, i.e., the number of moles or mole fraction of R.

The M and R components are associated with the material as a result of their presence during crystallization, and are easily removed or, in the case of M, replaced by post-crystallization methods hereinafter more particularly described.

To the extent desired, the original M, e.g., sodium or chloride, ions of the as-synthesized material of this invention can be replaced in accordance with techniques well known in the art, at least in part, by ion exchange with other ions. Preferred replacing ions include metal ions, hydrogen ions, hydrogen precursor, e.g., ammonium ions and mixtures thereof Particularly preferred ions are those which tailor the catalytic activity for certain hydrocarbon conversion reactions. These include hydrogen, rare earth metals and metals of Groups IA (e.g. K), IIA (e.g. Ca) VIIA (e.g. Mn), VIIIA (e.g. Ni), IB (e.g. Cu), IIB (e.g. Zn), IIIB (e.g. In), IVB (e.g. Sn) and VIIB (e.g. F) of the Periodic Table of the Elements (Sargent-Welch Scientific Co. Cat. No. S-18806, 1979) and mixtures thereof The crystalline (i.e. meant here as having sufficient order to provide a diffraction pattern such as, for example, by X-ray, electron or neutron diffraction, following calcination with at least one peak) mesoporous material of this invention may be characterized by its heretofore unknown structure, including extremely large pore windows, and high sorption capacity. The term "mesoporous" is used here to indicate crystals having uniform pores within the range of from about 13 Angstroms to about 200 Angstroms. The materials of this invention will have uniform pores within the range of from about 13 Angstroms to about 200 Angstroms, more usually from about 15 Angstroms to about 100 Angstroms. for the purposes of this application, a working definition of "porous" is a material that adsorbs at least 1 gram of a small molecule, such as Ar., $N_2$, n-hexane or cyclohexane, per 100 grams of the solid.

The material of the present invention can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. The material appears to have a hexagonal arrangement of large open channels that can be synthesized with open internal diameters from about 13 Angstroms to about 200 Angstroms. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials.

The most regular preparations of the material of the present invention give an X-ray diffraction pattern with a few distinct maxima in the extreme low angle region. The positions of these peaks approximately fit the positions of the hkO reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparation with only distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of large channels and the corresponding electron diffraction pattern gives an approximately hexagonal arrangement of diffraction maxima. The $d_{100}$ spacing of the electron diffraction patterns is the distance between adjacent spots on the hkO projection of the hexagonal lattice and is related to the repeat distance $a_o$ between channels observed in the electron micrographs through the formula $d_{100}=a_o\sqrt{3/2}$. This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. These patterns can be indexed with the hexagonal hkO subset of unique reflections of 100, 110, 200, 210, etc., and their symmetry-related reflections.

In its calcined form, the crystalline material of the invention may be further characterized by an X-ray diffraction pattern with at least one peak at a position greater than about 18 Angstrom Units d-spacing (4.909 degrees two-theta for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g., thermal treatment. Pore blocking inorganic amorphous materials, e.g., silica, and organics may be removed by contact with acid or base or other chemical agents such that the detrital material will be removed without detrimental effect on the crystal of the invention.

More particularly, the calcined crystalline non-layered material of the invention may be characterized by an X-ray diffraction pattern with at lest two peaks at positions greater than about 10 Angstrom Units d-spacing (8.842 degrees two-theta for Cu K-alpha radiation), at least one of which is at a position greater than about 18 Angstrom Units d-spacing, and no peaks at positions less than about 10 Angstrom Units d-spacing with relative intensity greater than about 20% of the strongest peak. Still more particularly, the X-ray diffraction pattern of the calcined material of this invention will have no peaks at positions less than about 10 Angstrom Units d-spacing with relative intensity greater than about 10% of the strongest peak. In any event, at least one peak in the X-ray diffraction pattern will have a d-spacing that corresponds to the $d_{100}$ value of the electron diffraction pattern of the material.

Still more particularly, the calcined inorganic, non-layered crystalline material of the invention is characterized as having a pore size of about 13 Angstroms or greater as measured by physisorption measurements hereinafter more particularly set forth. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used starting from the X-ray tube source, were 0.5, 1.0, 0.3 and 0.2 mm, respectively. Different slit systems may produce differing intensities for the peaks. The material with the largest pore size may require more highly collimated incident X-ray beams in order to resolve the low angle peak from the transmitted incident X ray beam.

The diffraction data were recorded by step-scanning at 0.04 degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (2514 49) and w=weak (0–24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, frame work composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination, at, for example, about 540° C. for at least about one hour and other treatment, if necessary, in an attempt to remove any pore blocking contaminants, at 25° C. and 50 torr benzene until equilibrium is reached. The weight of benzene sorbed is then determined as described hereinafter.

The M41S may be treated to remove part or all of any organic constituent, or in some cases it may simply be left in, leaving the catalytic cracking catalyst regenerator to do the job of burning out the organics.

The M41 S may be beneficially given a thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience such as in air, nitrogen, ammonia, etc. The thermal treatment can be performed at a temperature up to about 750° C.

The crystalline material should usually be dehydrated, at least partially. This can be done by heating to a temperature in the range of 200° C. to 595° C. in an atmospheres such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

As described, for example, in U.S. Pat. No. 5,057,296, the present crystalline material can be prepared by one of several methods, each with particular limitations.

A first method involves a reaction mixture having an $X_2O_3/YO_2$ mole ratio of from 0 to about 0.5, but an $Al_2O_3/SiO_2$ mole ratio of from 0 to 0.01, a crystallization temperature of from about 25° C. to about 250° C. preferably from about 50° C. to about 175° C., and an organic directing agent, hereinafter more particularly described, or, preferably a combination of that organic directing agent plus an additional organic directing agent, hereinafter more particularly described. The first method comprises preparing a reaction mixture containing sources of, for example, alkali or alkaline earth metal (M), e.g. sodium or potassium, cation if desired, one or combination of oxides selected from the group consisting of divalent element W, e.g., cobalt, trivalent element X, e.g., aluminum, tetravalent element Y, e.g. silicon, and pentavalent element Z, e.g. phosphorous, an organic (R) directing agent, hereinafter more particularly described, and a solvent or solvent mixture, such as, for example, $C_1$–$C_6$ alcohols, $C_1$–$C_6$ diols and/or water, especially water, said reaction mixture having a composition, in terms of mole rations of oxides, within the following ranges:

| REACTANTS | USEFUL | PREFERRED |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/ $(YO_2 + WO + Z_2O_5 + X_2O_3)$ | 1 to 1500 | 5 to 1000 |
| $OH/YO_2$ | 0 to 10 | 0 to 5 |
| $(M_{2/e}O + R_{2/f}O/ (YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.01 to 2.0 | 0.03 to 1.0 | wherein e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the present crystalline material. In this, as well as the following methods for synthesis of the present material the $R_{2/f}O/(YO_2+WO+Z_2O_5+X_2O_3)$ ratio is important. When the ratio is less than 0.01 or greater than 2.0, impurity products tend to be synthesized at the expense of the present material.

A second method for synthesis of the present crystalline material involves a reaction mixture having an $X_2O_3/YO_2$ mole ratio of from about 0 to about 0.5, a crystallization temperature of from about 25° C. to about 250° C., preferably from about 50° C. to about 175° C., and two separate organic directing agents, i.e., the organic and additional organic directing agents, hereinafter more particularly described. This second method comprises preparing a reaction mixture containing sources of, for example, alkali, or alkaline earth metal (M, e.g., sodium or potassium, cation if desired, one or a combination of oxides selected from the group consisting of divalent element W. e.g., cobalt, trivalent element X, e.g., aluminum, tetravalent element Y, e.g., silicon, and pentavalent element Z., e.g., phosphorous, a combination of organic directing agent and additional organic directing agent (R), each hereinafter more particularly described, and a solvent or solvent mixture, such as, for example, $C_1$–$C_6$ alcohols, $C_1$–$C_6$ diols and/or water, especially water, said reaction mixture having a composition, in terms of mole rations of oxides, within the following ranges:

| REACTANTS | USEFUL | PREFERRED |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/ $(YO_2 + WO + Z_2O_5 + X_2O_3)$ | 1 to 1500 | 5 to 1000 |
| $OH/YO_2$ | 0 to 10 | 0 to 5 |
| $(M_{2/e}O + R_{2/f}O)/ (YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.1 to 2.0 | 0.12 to 1.0 | wherein e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the pH is not narrowly important for crystallization of the present invention.

A third method for synthesis of the present crystalline material is where X comprises aluminum and Y comprises silicon, the crystallization temperature must be from about 25° to about 175° C., preferably from about 50° C. to about 150° C., and an organic directing agent, hereinafter more particularly described, or, preferably a combination of that organic directing agent plus an additional organic agent, hereinafter more particularly described, is used. This third method comprises preparing a reaction mixture containing sources of, for example, alkali or alkaline earth metal (M), e.g., sodium or potassium, cation if desired, one or more sources of aluminum and/or silicon, an organic (R) directing agent, hereinafter more particularly described, and a solvent or solvent mixture, such as, for example $C_1$–$C_6$ alcohols, $C_1$–$C_6$ diols and/or water, especially water, said reaction mixture having a composition, in terms of mole ratios of oxides, within the following ranges:

| REACTANTS | USEFUL | PREFERRED |
|---|---|---|
| $Al_2O_3/SiO_2$ | 0 to 0.5 | 0.001 to 0.5 |
| $Solvent/SiO_2$ | 1 to 1500 | 5 to 1000 |
| $OH/SiO_2$ | 0 to 10 | 0 to 5 |
| $(M_{2/e}O + R_{2/f}O)/(SiO_2 + Al_2O_3)$ | 0.01 to 20 | 0.05 to 5 |
| $M_{2/e}O/(SiO_2 + Al_2O_3)$ | 0 to 5 | 0 to 3 |
| $R_{2/f}O/(SiO_2 + Al_2O_3)$ | 0.01 to 2 | 0.03 to 1 | wherein e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ration of solvent/$R_{2/f}$ is within the range of from about 50 to about 800, preferably from about 50 to 500. The mixture constitutes the "primary template" for the synthesis method.

(2) To the primary template mixture of step (1) add the sources of oxides, e.g., silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the present synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) Mix the primary template mixture of step (1) with tetraethylorthosilicate and a source of aluminum oxide, if desired, such that the $R_{2/f}O/SiO_2$ mole ratio is in the range of from about 0.5 to about 2.0.

(3) Agitate the mixture resulting from step (2) from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for form about 4 to about 72 hours, preferably from about 16 to about 48 hours.

In each of the above methods, batch crystallization of the present crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g., from about 5 minutes to about 14 days. Thereafter, the crystals are separated from the liquid and recovered.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

By adjusting conditions of the synthesis reaction for each method like temperature, pH and time of reaction, etc., within the above limits, embodiments of the present non-layered crystalline material with a desired average pore size may be prepared. In particular, changing the pH, the temperature or the reaction time may promote formation of product crystals with different average pore size.

Non-limiting examples of various combinations of W, X, Y and Z contemplated for the first and second synthesis methods of the present invention include:

| W | X | Y | Z |
|---|---|---|---|
| — | Al | Si | — |
| — | Al | — | P |
| — | Al | Si | P |
| Co | Al | — | P |
| Co | Al | Si | P |
| — | — | Si | — | including the combinations of W being Mg, or an element selected from the divalent first row transition metals, e.g., Mn, Co and Fe: X being B, Ga or Fe; and Y being Ge.

An organic directing agent for use in each of the above methods for synthesizing the present material from the respective reaction mixtures is an ammonium or phosphonium ion of the formula $R_1R_2R_3R_4Q^+$, i.e.:

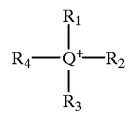

wherein Q is nitrogen or phosphorous and wherein at least one of $R_1$, $R_2$, $R_3$ and $R_4$ is aryl or alkyl of from 6 to about 36 carbon atoms, e.g., —$C_6H_{13}$, —$C_{10}H_{21}$, —$C_{12}H_{25}$, —$C_{14}H_{29}$, —$C_{16}H_{33}$ and —$C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof Any such combination of organic directing agents go to make up "R" and will be in molar ratio of about 100/1 to about 0.01/1, first above listed organic directing agent/additional organic directing agent.

The particular effectiveness of the presently required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, octadecyltrimethylphosphonium, cetylpyridinium, myristyltrimethylammonium, decyltrimethylammonium, dodecyltrimethylammonium and dimethyldidodecylammonium.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In order to more fully illustrate the nature of the invention and the manner of practicing same, the following examples are presented. In the examples, whenever sorption data are set forth for comparison of sorptive capacities for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition exhibits an equilibrium benzene adsorption capacity at 50 Torr and 25° C. of greater than about 15 grams/100 grams, particularly greater than about 17.5 g/100 g/ and more particularly greater than about 20 g/100 g.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is absorbed by the new crystal, the decrease in pressure causes the manostat to open a valve which admits more adsorbate vapor to the chamber to restore the above control pressure. Sorption is complete when the pressure change is not sufficient to activate the manostat.

Another way of doing this for benzene adsorption data is on a suitable thermogravimetric analysis system, such as a computer-controlled 990/951 duPont TGA system. The adsorbent sample is dehydrated (physically sorbed water removed) by heating at, for example, about 350° C. or 500° C. to constant weight in flowing helium. If the sample is in as-synthesized form, e.g., containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of the adsorption isotherm.

In the examples, percentages are by weight unless otherwise indicated.

EXAMPLE 1

A sample of MCM-41 (U.S. Pat. No. 5,098,684) with a bulk $SiO_2/Al_2O_3$ ratio of 40 and pore size of 40 Angstroms was $NH_4Cl$ exchanged, washed Cl free, and calcined in air to remove the organic. The resulting material had a surface area of 700 $m^2/g$ and a water pore volume of 2.42 cc/g.

EXAMPLE 2

150 g of sample from Example 1 were impregnated with a $La(NO_3)_3 \cdot 5H_2O$ solution prepared by dilution of 510 gms of 50% wt/wt to 363 ml total volume. The sample was then dried and calcined in air at 1000° F.

EXAMPLE 3

Comparative Additive A was prepared by spray drying a slurry containing 32% of the product of example 1, 38% Clay, and 30% 10:1 wt/wt $SiO_2/Al_2O_3$ matrix.

EXAMPLE 4

Additive B according to the invention was prepared by spray drying a slurry containing 40% of the product of example 2, 30% clay, and 30% 10:1 wt/wt $SiO_2/Al_2O_3$ matrix.

EXAMPLE 5

Catalysts A and B were prepared by separately mixing 20% of Additive A and Additive B with 80% of a catalyst which included USY with silica and clay matrix (OCTACAT™, Davison Div. of WR Grace & Co., Conn.)

EXAMPLE 6

Catalyst alone (Octacat), as well as Catalyst A and B were divided into two halves. The first half of each catalyst was steamed for 10 hours at 50% steam atmosphere, 1400° F. and 25 psig. The resulting catalysts were designated Octacat-S, Catalyst A-S and Catalyst B-S respectively.

The other halves of the three catalysts were also steamed and impregnated with vanadium naphthenate in toluene resulting in 5,000 ppm vanadium to simulate vanadium deactivation of FCC catalysts under commercial conditions. These catalysts were designed Octacat-SV, Catalyst A-SV and Catalyst B-SV respectively.

EXAMPLE 7

The six catalysts prepared in Example 6 were tested for catalyst activity using the fluidized activity test (FAI): fixed-fluidized bed FCC units (850° F., catalyst/oil ratio of 2, 5 minutes on stream, Light East Texas Gas Oil (LETGO) feed—Table 1). Results are shown in Table 2.

TABLE 1

LIGHT EAST TEXAS GAS OIL FEEDSTOCK PROPERTIES

| | |
|---|---|
| API | 36.4 |
| Distillation (D1160): | |
| IBP, ° F. (vol %) | 455 |
| 10% | 489 |
| 30% | 515 |
| 50% | 548 |
| 70% | 585 |
| 90% | 646 |
| EP | 687 |
| Bromine No. | 0.50 |
| KV @ 100° C., cs | 1.30 |
| Molecular Weight | 269 |
| Pour Point, ° F. | 20 |
| CCR, wt % | 0.02 |
| Refractive Index @ 70° C. | 1.4492 |
| Aniline Point, ° F. | 168 |
| Hydrogen, wt % | 13.3 |
| Sulfur, wt % | 0.13 |
| Total Nitrogen, ppm | 300 |
| Basic Nitrogen, ppm | 45 |
| Nickel, ppm | 0.1 |
| Vanadium, ppm | 0.1 |
| Iron, ppm | 0.77 |
| Copper, ppm | 0.05 |
| Paraffins, wt % | 44.7 |
| Naphthenes | 33.2 |
| Aromatics, wt % | 22.1 |

TABLE 2

| Catalyst | Description of Catalyst | Metals | FAI % Conversion | Activity Retention |
|---|---|---|---|---|
| Octacat-S | Octacat | No | 71.7 | |
| Octacat-SV | Octacat | 0.54% V | 35.4 | 49% |
| Catalyst A-S | Octacat + MCM-41 | No | 58.3 | |
| Catalyst A-SV | Octacat + MCM-41 | 0.48% V | 37.5 | 64% |
| Catalyst B-S | Octacat + $La_2O_3$-MCM-41 | No | 62.1 | |
| Catalyst B-SV | Octacat + $La_2O_3$-MCM-41 | 0.57% V | 53.2 | 86% |

The results in Table 2 show that compositions of the invention mitigate catalyst metal poisoning. Catalyst B-SV according to the invention resulted in activity retention of 86%, while activity retention in comparative catalysts was much lower.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

We claim:

1. A composition comprising a non-layered, ultra large pore crystalline M41S material exhibiting, after calcination, an X-ray diffraction pattern with at least one peak at a position greater than about 18 Angstrom Units d-spacing with a relative intensity of 100, and a benzene adsorption capacity of greater than about 15 grams benzene per 100 grams anhydrous crystal at 50 torr and 25° C., and a metal passivator incorporated within the crystalline material, said passivator is a rare earth metal compound, an alkali earth metal compound, or a combination thereof.

2. The composition of claim 1 wherein the composition is a metal trap for passivating metal contaminants in fluid catalytic cracking.

3. The composition of claim 1 wherein the alkaline earth metal is magnesium, calcium or barium.

4. The composition of claim 1 wherein the rare earth metal is lanthanum.

5. The composition of claim 1 wherein the metal passivator is an oxide.

6. The composition of claim 1 wherein the metal passivator comprises from about 0.1 to about 25 weight percent of the composition.

7. The composition of claim 1 wherein the composition is an additive for an FCC catalyst.

8. The composition of claim 7 wherein the composition is added in an amount from about 10 to about 50 weight percent of the FCC catalyst.

9. The composition of claim 7 wherein the FCC catalyst is a rare earth exchanged faujasite, ultrastabilized faujasite, or a combination thereof.

10. The composition of claim 8 wherein the FCC catalyst is a rare earth exchanged faujasite, ultrastabilized faujasite, or a combination thereof.

11. The composition of claim 1 wherein the composition is a component of an FCC catalyst.

12. The composition of claim 11 wherein the composition comprises from about 10 to about 25 weight percent of the FCC catalyst.

13. The composition of claim 1 wherein the crystalline material itself comprises an FCC catalyst.

* * * * *